US006988950B2

(12) United States Patent
Kuczera et al.

(10) Patent No.: US 6,988,950 B2
(45) Date of Patent: Jan. 24, 2006

(54) PLUNGING CONSTANT VELOCITY JOINT FOR A PROPSHAFT TUNED FOR ENERGY ABSORPTION

(75) Inventors: Ramon Kuczera, Clarkston, MI (US); Michael Miller, White Lake, MI (US); Donald Dine, Rochester Hills, MI (US); James Lyon, Northampton (GB)

(73) Assignee: GKN Driveline North America, Inc., Auburn Hills, MI (US)

( * ) Notice: Subject to any disclaimer, the term of this patent is extended or adjusted under 35 U.S.C. 154(b) by 0 days.

(21) Appl. No.: 10/729,516

(22) Filed: Dec. 5, 2003

(65) Prior Publication Data

US 2005/0124420 A1    Jun. 9, 2005

(51) Int. Cl.
*F16D 3/205* (2006.01)

(52) U.S. Cl. .................................... 464/111; 464/906
(58) Field of Classification Search ............... 464/111, 464/146, 122–124, 906; 280/777
See application file for complete search history.

(56) References Cited

U.S. PATENT DOCUMENTS

| | | | |
|---|---|---|---|
| 3,696,638 A | | 10/1972 | Smith et al. |
| 3,817,057 A | * | 6/1974 | Orain ...................... 464/111 X |
| 4,196,598 A | * | 4/1980 | Hirai et al. .................. 464/111 |
| 4,605,384 A | * | 8/1986 | Kurzeja et al. .............. 464/111 |
| 4,674,993 A | * | 6/1987 | Mazziotti et al. ........... 464/111 |
| 5,118,214 A | | 6/1992 | Petrzelka et al. |
| 5,230,658 A | | 7/1993 | Burton |
| 5,320,579 A | | 6/1994 | Hoffmann |
| 5,460,573 A | * | 10/1995 | Krude ......................... 464/111 |
| 5,582,546 A | | 12/1996 | Welschof |
| 5,836,825 A | | 11/1998 | Yamane |
| 5,944,612 A | | 8/1999 | Schwarzler |
| 6,033,311 A | | 3/2000 | Bartlett |
| 6,071,195 A | | 6/2000 | Krude |
| 6,171,196 B1 | | 1/2001 | Welschof |
| 6,210,282 B1 | | 4/2001 | Hofmann |
| 6,234,908 B1 | | 5/2001 | Jacob |
| 6,251,019 B1 | | 6/2001 | Hofmann et al. |

(Continued)

FOREIGN PATENT DOCUMENTS

GB    1327952    8/1973

(Continued)

OTHER PUBLICATIONS

PCT Notification of Transmittal of the International Search Report and the Written Opinion of the International Searching Authority, Mar. 10, 2005, 3 pages.

(Continued)

*Primary Examiner*—Greg Binda
(74) *Attorney, Agent, or Firm*—Jennifer M. Brumbaugh; Mick A. Nylander

(57) ABSTRACT

A constant velocity joint with an outer part having innerly a normal range, an extended range, and a plurality of outer bores circumferentially spaced between a plurality of longitudinally extending tracks, Each track having a bottom spaced between two oppositely disposed sidetracks. An inner part is disposed within said outer joint part, having a plurality of sides circumferentially spaced between a plurality of trunions, each trunion having a top and an inner race. Also, a plurality of rollers each having an inner bore are mounted on said inner race of each trunion, whereby angular and axial displacement occur between the inner joint and the outer joint. Wherein at least one energy absorption surfaces is located in the extended range on the outer part. The energy absorption surface interferes with at least one of the rollers when the joint is operated beyond said normal range.

14 Claims, 5 Drawing Sheets

U.S. PATENT DOCUMENTS

| | | |
|---|---|---|
| 6,251,021 B1 | 6/2001 | Jacob |
| 6,254,487 B1 | 7/2001 | Jacob |
| 6,261,184 B1 | 7/2001 | Jacob et al. |
| 6,299,544 B1 | 10/2001 | Schwarzler et al. |
| 6,350,205 B1 | 2/2002 | Kuhnhold et al. |
| 6,585,602 B2 | 7/2003 | Cermak et al. |
| 6,666,771 B2 * | 12/2003 | Boutin ..................... 464/146 |
| 6,776,720 B2 * | 8/2004 | Bartlett ..................... 464/111 |
| 2003/0008716 A1 | 1/2003 | Boutin |
| 2003/0045365 A1 | 3/2003 | Booker |
| 2003/0078107 A1 | 4/2003 | Margerie |

FOREIGN PATENT DOCUMENTS

JP           05180237 A      7/1993

OTHER PUBLICATIONS

PCT International Search Report by the International Searching Authority of the European Patent Office, Mar. 10, 2005, 4 pages.

PCT Written Opinion of the International Searching Authority of the European Patent Office, Mar. 10, 2005, 5 pages.

* cited by examiner ns and energy
PLUNGING CONSTANT VELOCITY JOINT FOR A PROPSHAFT TUNED FOR ENERGY ABSORPTION

TECHNICAL FIELD

The present invention relates generally to motor vehicle propeller shafts, and more particularly concerns a constant velocity joint having improved crash-worthiness and energy absorption capabilities within a propeller shaft of a motor vehicle.

BACKGROUND OF THE INVENTION

Constant velocity joints are common components in automotive vehicles. Typically, constant velocity joints are employed where transmission of a constant velocity rotary motion is desired or required. Common types of constant velocity joints include end motion or plunging and fixed motion designs. Of particular interest is the end motion or plunging type constant velocity joints, which include a tripod joint, a double offset joint, a cross groove joint, and a cross groove hybrid. Of these plunging type joints, the tripod type constant velocity joint uses rollers as torque transmitting members, and the others use balls as torque transmitting members. Typically, these types of joints are used on the inboard (toward the center of the vehicle) on front sideshafts and on the inboard or outboard side for sideshafts on the rear of the vehicle and on the propeller shafts found in rear wheel drive, all wheel drive, and four-wheel drive vehicles.

Propeller shafts are commonly used in motor vehicles to transfer torque and rotational movement from the front of a vehicle to a rear axle differential such as in a rear wheel and all wheel drive vehicles. Propeller shafts are also used to transfer torque and rotational movement to the front axle differential in four-wheel drive vehicles. In particular, two-piece propeller shafts are commonly used when larger distances exist between the front drive unit and the rear axle of the vehicle. Similarly, side shafts are commonly used in motor vehicles to transfer torque from a differential to the wheels. The propeller shaft and side shafts are connected to their respective driving input and output components by a joint or series of joints. Joint types used to connect the propeller shaft and side shafts include Cardan, Rzeppa, tripod and various ball type joints.

In addition to transmitting torque and rotary motion, propeller shafts and side shafts allow for axial motion in many automotive applications. Specifically, axial motion is designed into two-piece propeller shafts by using an end motion or plunging type constant velocity joint.

Besides transferring mechanical energy and accommodating axial movement, it is desirable for plunging constant velocity joints to have adequate crash-worthiness. In particular, it is desirable for the constant velocity joint to be shortened axially preventing the propeller shaft or side shaft from buckling, penetrating the passenger compartment, or damaging other vehicle components in close proximity of the propeller shaft or side shaft. In many crash situations, the vehicle body shortens and deforms by absorbing energy that reduces the acceleration; further protecting the occupants and the vehicle. As a result, it is desirable for the propeller shaft be able to reduce in length during the crash, allowing the constant velocity joint to travel beyond its operational length. It is also desirable for the constant velocity joint within the propeller shaft to absorb a considerable amount of the deformation energy during the crash. Reduction of the propeller shaft length during a crash situation is often achieved by having the propeller shaft telescopically collapse and energy absorb thereafter.

In telescopic propeller shaft assemblies, the joint must translate beyond the constant velocity joint limitation before the telescopic nature of the propeller shaft is effectuated. In some designs, the propeller shaft must transmit the torque as well as maintain the ability to telescope. In other designs, the telescopic nature of the joint only occurs after destruction of the joint, joint cage or some type of joint retaining ring. Still in other designs, the joint must first translate the balls off the race area before the telescopic attribute can be used for axial joint displacement. The limitation of the telescopic ability is that the constant velocity joint must be compromised before axial displacement can occur in a crash situation. Therefore, there is a desire to have a constant velocity joint that can accommodate the axial displacement during a crash.

Furthermore, the energy absorption only occurs after the functional limit of the constant velocity joint has been surpassed. This causes a time delay in the energy absorption of the propeller shaft. Then and only then, the energy absorption is accomplished and typically has a force step or impulse energy absorption pattern. After the initial energy absorption, typically, there is no further energy absorption in the propeller shaft. In another situation there is further energy absorption, but only after the joint balls successfully translate off the joint race and onto the propeller shaft. Therefore, there is a desire to have a constant velocity joint that has a controlled or tuned force energy absorption profile over a range of the joint's axial travel distance, especially when the normal operational range of the joint has been surpassed.

It would be advantageous to have the above-mentioned features in the tripod joint. Automotive manufactures and suppliers commonly know the tripod constant velocity joint as a GI type joint. The invention, here below, relates to this type of joint. A tripod joint is used for accommodating angular and axial displacements in a propeller shaft while transmitting rotational motion and torque. Propeller shafts and side shafts are used, in turn, to connect a drive unit, i.e. transmission, to a rear axle gearbox or differential. The tripod joint comprises an outer joint part having innerly a plurality of outer bores circumferentially spaced between a plurality of longitudinally extending tracks. Each track has a bottom spaced between two oppositely disposed longitudinal sidetracks. There is an inner joint part disposed within said outer joint part having a plurality of spider sides circumferentially spaced between a plurality of trunions. Each trunion has a top and an inner race where a plurality of rollers having an inner bore are mounted on said inner race of each said trunion. Angular and axial displacements occur between the inner joint and the outer joint.

SUMMARY OF THE INVENTION

The present invention is directed toward a constant velocity joint for use in a vehicle driveline having at least one energy absorption element for improved crash-worthiness and energy absorption. In particular, at least one energy absorption element of the constant velocity joint described herein is tuned to control joint energy absorption for axial displacement beyond the normal axial travel range of the joint.

The present invention provides an energy absorbing plunging constant velocity joint for improved crash-worthiness. In particular, a constant velocity joint has an outer joint part having innerly a normal axial range, an extended axial range, and a plurality of outer bores circumferentially spaced between a plurality of longitudinally extending tracks. Each track has a bottom spaced between two oppositely disposed sidetracks. Additionally, an inner joint part is disposed within said outer joint part and has a plurality of spider sides circumferentially spaced between a plurality of trunions. Each trunion has a top and an inner race. In addition, a plurality of rollers each having an inner bore are mounted adjacent to the inner race of each trunion. Angular and axial displacement occur between the inner joint part and the outer joint part. At least one energy absorption surfaces is located in the extended axial range on the outer joint part. Wherein the energy absorption surface interferes with the inner joint part when the joint is operated beyond said normal axial range, allowing the joint to absorb the thrust energy.

An advantage of the present invention is that the constant velocity joint absorbs energy within an extended axial range when the joint is thrust beyond its normal axial range. The present invention itself, together with further objects and intended advantages, will be best understood by reference to the following detailed description, taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

In the following description, various operating parameters and components are described for one constructed embodiment. These specific parameters and components are included as examples and are not meant to be limiting.

While the invention is described with respect to an apparatus having improved crash-worthiness within a propeller shaft of a vehicle, the following apparatus is capable of being adapted for various purposes including automotive vehicle drive axles, and other vehicles and non-vehicle applications which require collapsible propeller shaft assemblies.

Figure 1:
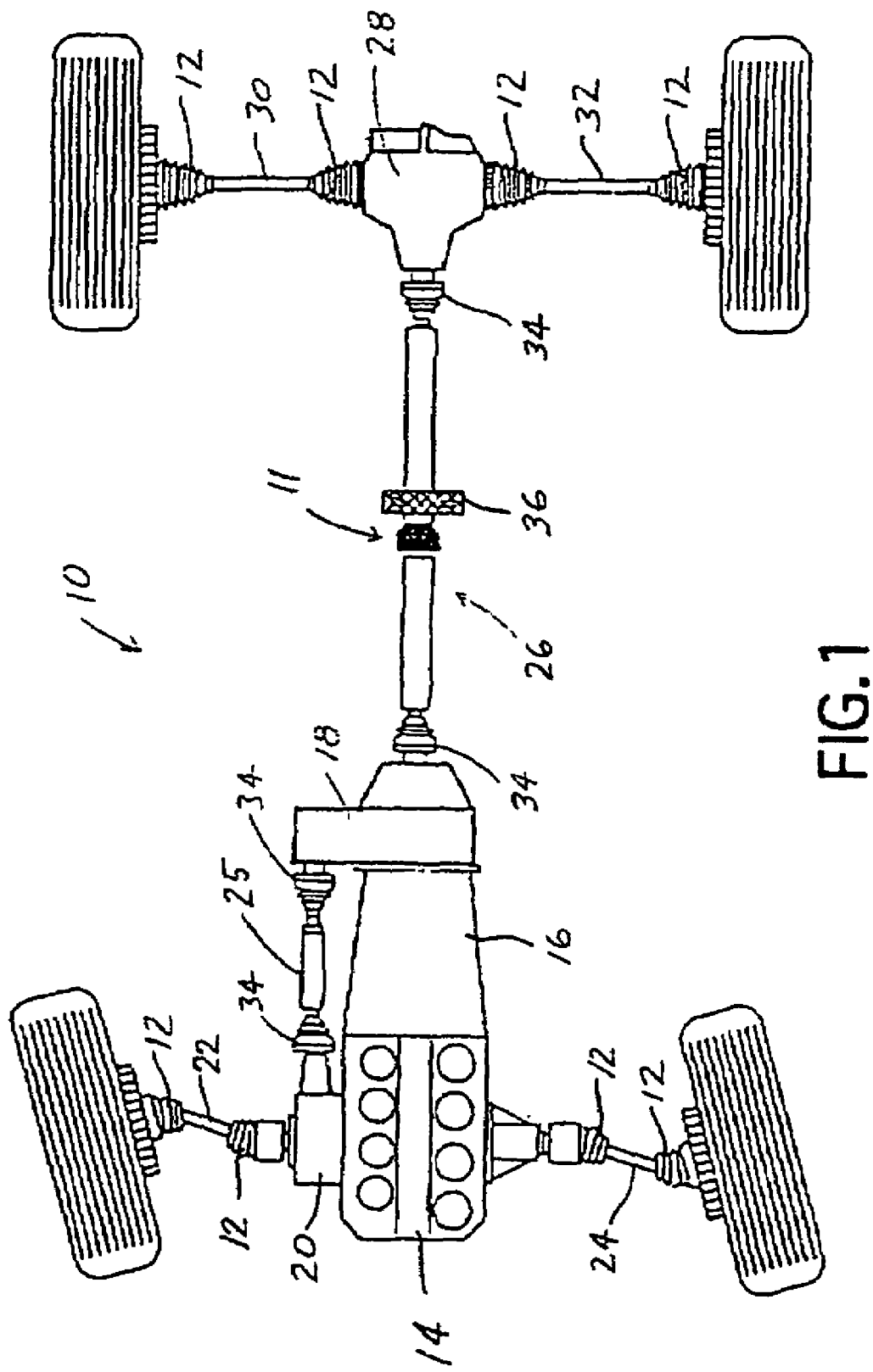
FIG. 1 shows a plan view of a four-wheel drive vehicle driveline in which the present invention may be used to advantage.

Referring now to FIG. 1, there is shown a plan view of four-wheel drive vehicle driveline 10 wherein a constant velocity joint 11 in accordance with the present invention may be used to advantage. The driveline shown in FIG. 1 is typical for a four-wheel drive vehicle, however, it should be noted that the constant velocity joint 11 of the present invention can also be used in rear wheel drive only vehicles, front wheel drive only vehicles, all wheel drive vehicles, and four-wheel drive vehicles. The vehicle driveline 10 includes an engine 14 that is connected to a transmission 16 and a power takeoff unit such as a transfer case 18. The front differential 20 has a right hand side shaft 22 and left hand side shaft 24, each of which are connected to a wheel and deliver power to the wheels. On both ends of the right hand front side shaft 22 and the left hand front side shaft 24 are constant velocity joints 12. A front propeller shaft 25 connects the front differential 20 to the transfer case 18. A propeller shaft 26 connects the transfer case 18 to the rear differential 28, wherein the rear differential 28 is coupled to a rear right hand side shaft 30 and a rear left hand side shaft 32, each of which is connected to a respective wheel. Constant velocity joints 12 are located on both ends of the side shafts 30, 32 that connect the rear wheels to the rear differential 28. The propeller shaft 26, shown in FIG. 1, is a two-piece propeller shaft. Each end includes a rotary joint 34 which may comprise a cardan joint or any one of several types of constant velocity joints or non-constant velocity joints. Between the two pieces of the propeller shaft 26 is a high speed constant velocity joint 11 in accordance with the present invention as well as a support 36 such as an intermediate shaft bearing. The constant velocity joints 11, 12, 34 transmit power to the wheels through the propeller shaft 26, front propeller shaft 25 and side shafts 22, 24, 30, 32 even if the wheels or the shafts 25, 26 have changing angles due to the steering or raising or lowering of the suspension of the vehicle. The constant velocity joints 11, 12, 34 may be any of the standard types known and used to advantage, such as a plunging tripod, a cross-groove joint, a cross-groove hybrid joint, or a double offset joint or any other type of constant velocity joint.

Figure 2:
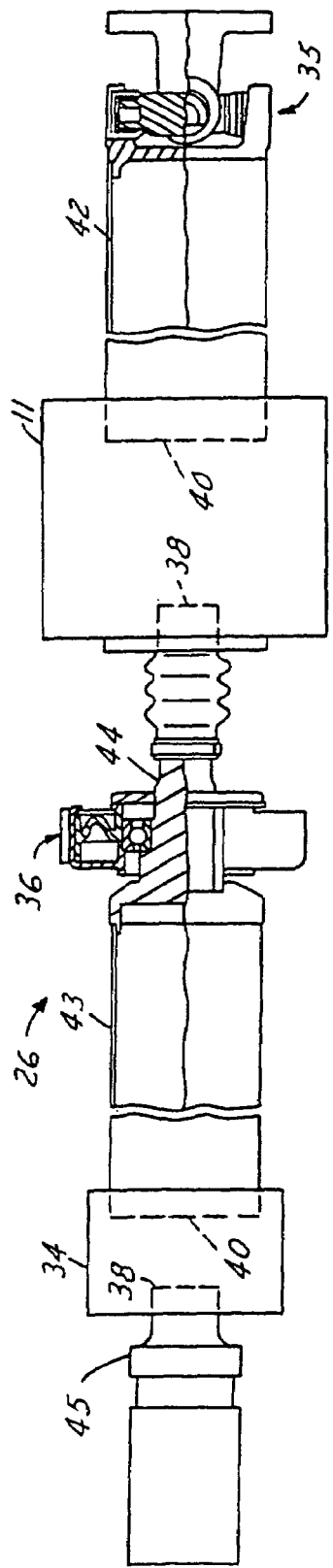
FIG. 2 shows a half-sectional view of a vehicle propeller shaft assembly comprising one or more constant velocity joints in accordance with one embodiment of the present invention.

FIG. 2 shows a half-sectional view of a vehicle propeller shaft 26 assembly comprising one or more constant velocity joints 11, 34 in accordance with one embodiment of the present invention. The propeller shaft 26 assembly may include one, two or a combination of constant velocity joints 11, 34. The constant velocity joint can be of a monobloc, disc, flanged, or other styles of design know to those in the art. The propeller shaft 26 assembly transfers torque from the transmission 16 to the rear differential 28 by way of the propeller shaft 26. The constant velocity joints 11, 34 are axially plungeable. The constant velocity joints 11, 34 have an inner joint part 38 and an outer joint part 40. The outer joint part 40 of constant velocity joint 11 is connected to one end of a hollow shaft 42 by, for example, a friction weld. The hollow shaft 42 being defined as having cylindrical shell having an inner diameter that is smaller than its outer diameter and two open ends. The other end of the hollow shaft 42 is connected to a rotary joint 35 that is connectable to a rear differential 28 or a transmission 16 depending upon the directional orientation of the propeller shaft 26. Into the inner joint part 38 there is inserted a connecting shaft 44 which, at a certain distance from the joint 11, is supported by a shaft bearing 36.

Similarly, in combination or alternatively, the outer joint part 40 of constant velocity joint 34 is connected to one end of a hollow shaft 43 by, for example, not shown, a bolted connection. The other end of the hollow shaft 43 is connected to a shaft bearing 36 on the opposite side of connecting shaft 44. Into the inner joint part 38 there is inserted a connecting shaft 45 which is connectable to a transmission 16 or a rear differential 28 depending upon the directional orientation of the propeller shaft 26. The propeller shaft 26 assembly transfers torque from the transmission 16 to the rear differential 28 by way of the propeller shaft 26.

In addition to torque transfer, the propeller shaft 26 can accommodate axial and angular displacements within the constant velocity joints 11, 34. Where axial movement and articulation of the hollow shafts 42, 43 is relative to the connecting shafts 44, 45. Axial movement is relative to the shaft centerlines. In certain crash situations, however, the connecting shaft 44, 45 will thrust axially toward the shafts 42, 43, beyond the normal operating range of the joint while engaging a tuned energy absorption surface. The tuned energy absorption surface extends over an extended axial range of the constant velocity joints 11, 34. Energy may be absorbed until the extended axial range is exceeded and the joint parts are released into the hollow shafts 42, 43 or are impeded by the hollow shafts 42, 43. The required thrust for axial movement may be increased or decreased by increasing or decreasing the amount of interference caused by the energy absorption surface.

Figure 3:
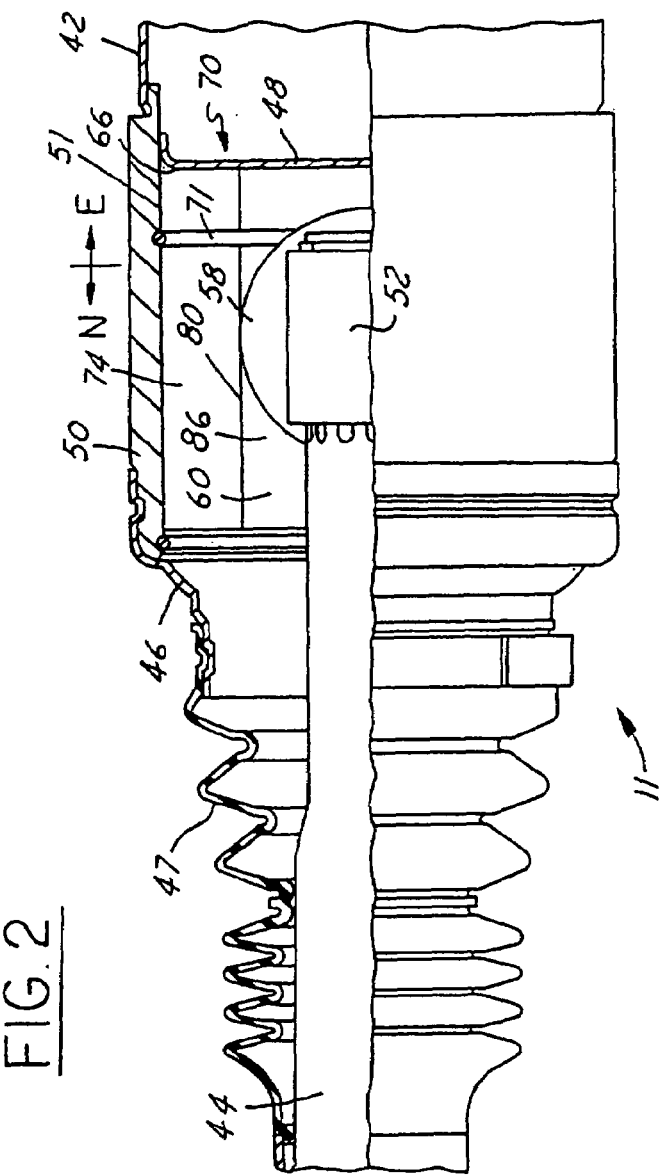
FIG. 3 shows a half-sectional view of a constant velocity joint in accordance with one embodiment of the present invention in a propeller shaft assembly.
Figure 4:
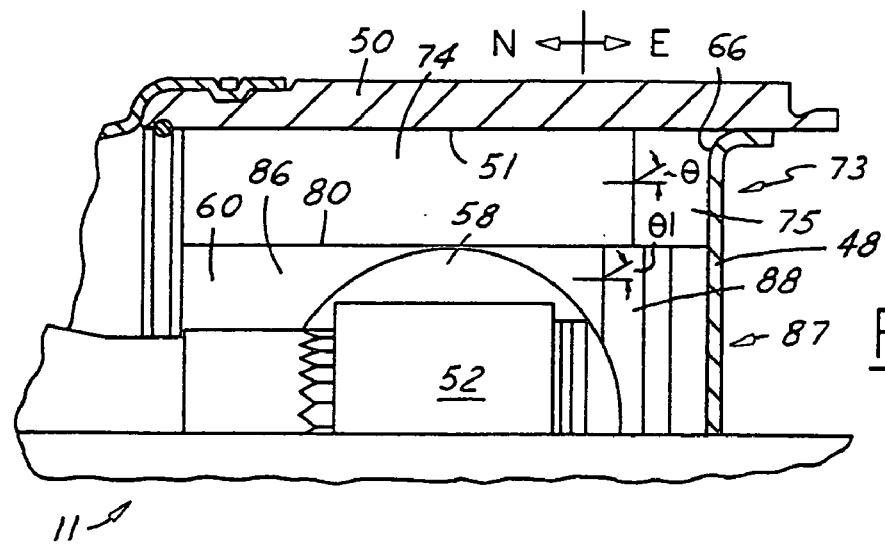
FIG. 4 shows a partial view of a constant velocity joint in accordance with an alternative embodiment of the present invention.
Figure 5:
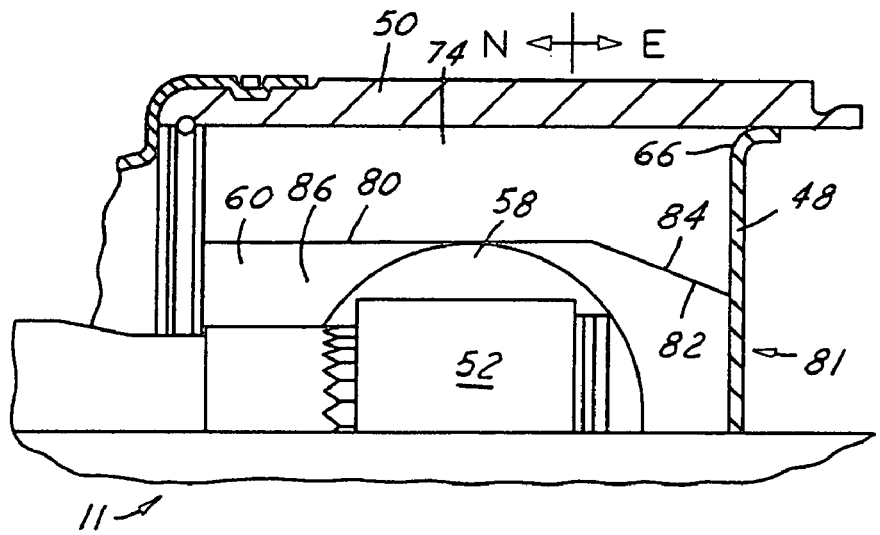
FIG. 5 shows a partial view of a constant velocity joint in accordance with an alternative embodiment of the present invention.

For clarity in the disclosure that follows, the inner joint part 52 is shown as a cylinder in the half-sectional views of FIGS. 3, 4 and 5 allowing the sectional view to depict one of the rollers 58 in a track 60. Reference may also be made to FIGS. 6, 7, 8 and 9 when FIGS. 3, 4 or 5 are discussed.

FIG. 3 shows a half-sectional view of a constant velocity joint 11 in accordance with one embodiment of the present invention in a propeller shaft assembly. The joint 11 is an axially plungeable constant velocity joint of the tripod type and comprises an outer joint part 50, an inner joint part 52, and a plurality of rollers 58. The outer joint part 50 has innerly a normal axial range N, an extended axial range E, and a plurality of outer bores 74 circumferentially spaced between a plurality of longitudinally extending tracks 60, each track 60 having a bottom 86 spaced between two oppositely disposed sidetracks 80.

The inner joint part 52 is disposed within said outer joint part 50 and has a plurality of spider sides 54 circumferentially spaced between a plurality of trunions 53. Each of the trunions 53 has a top 55 and an inner race 56. The plurality of rollers 58 have an inner bore 59. Each of the rollers 58 are mounted on the inner race 56 of one of the trunions 53. Thus, the outer joint part 50 and the inner joint part 52 are driveably connected through the rollers 58 located in the longitudinally extending tracks 60, allowing angular and axial displacement between the inner joint part 52 and the outer joint part 50.

The outer joint part 50 is connected to a hollow shaft 42 which is fixed to the outer joint part by, for example, a friction weld. The hollow shaft 42 may also be flanged and connected to the outer joint part by way of, for example, bolts.

Into the inner joint part 52 there is inserted a connecting shaft 44. A plate cap 46 is secured to the outer joint part 50. A convoluted boot 47 seals the plate cap 46 relative to the connecting shaft 44. The other end of the joint 11 at the cylindrical open end 66, i.e., towards the hollow shaft 42, is sealed by a grease cover 48. The grease cover 48 is generally displaceable such that during a crash or unintended thrust the grease cover 48 is dislodged or displaced from its general position near the cylindrical open end 66 of the joint 11. In addition, the grease cover 48 may provide some energy absorption should the connecting shaft 44 be thrust beyond the extended axial range E of constant velocity joint 11. The constant velocity joint 11 is designed to operate in its normal axial range N until, however, compression from crash or an unintended thrust is applied forcing the inner joint part 52 and the rollers 58 into or through the extended axial range.

In this embodiment of the present invention, the joint has a tuned energy absorption surface 70, which is a circlip 71. The circlip 71 is circumferentially located in the extended axial range E and coupled to the inside surface 51 of the outer joint part 50. The circlip 71, in this embodiment, is an annular ring, made from a deformable material, preferably metal or plastic, and positionable in the outer joint part 50 so as to reside in the longitudinally extending tracks 60. When the connecting shaft 44 along with the inner joint part 52 and the rollers 58 are thrust, as a result of an unintended force, such as a crash, beyond the normal axial range N and into the extended axial range E of the joint 11, the rollers 58, the tops 55 or the spider sides 54 of the inner joint part 52 will interfere with or be impeded by the circlip 71. The impediment of the circlip 71 causes an increase in the thrust required for axial motion, allowing energy to be absorbed by the constant velocity joint 11 and the propeller shaft 26. While impeding the motion of the joint 11 components, the circlip 71 may be dislodged, deformed or broken. The circlip 71 can be tuned to achieve different force levels, allowing for design of a controlled energy absorption profile within the constant velocity joint 11. The tuning may be accomplished by changing the size, the shape, the material, or the location of the circlip 71. There may be more than one circlip 71, although not shown, located within the extended axial range E of the constant velocity joint 11.

Thus, under normal operating conditions, the inner joint part 52 and the rollers 58 will operate in the normal axial range N of the constant velocity joint 11. In certain crash situations, however, the connecting shaft 44 along with the inner joint part 52 and the rollers 58 will be thrust toward the hollow shaft 42 allowing track and bore energy to be absorbed along the extended axial range E caused by the impediment of the circlip 71 upon the inside surface 51 of the outer joint part 50. It is contemplated that the circlip 71 could be a foreign body residing upon the extended axial range E absorbing plastic energy.

FIG. 4 shows a partial view of a constant velocity joint in accordance with an alternative embodiment of the present invention. In this embodiment, the joint has a tuned energy absorption surface 73, which is a bore surface 75. The bore surface 75 is circumferentially located in the extended axial range E, has an inclination θ and is coupled to the outer bore 74 of the outer joint part 50 between any two longitudinally extending tracks 60. In addition to or in the alternative, the bore surface 75 can have multiple inclinations, stepped inclination, or variable inclination. The bore surface 75 may be located between any one or more longitudinally extending tracks 60 or entirely upon all of the outer bores 74 in the extend axial range E. The bore surface 75 may be manufactured by layering, i.e. welding, material upon the outer bore 74 or by undercutting, while machining, the outer bore surface 74. One embodiment contemplates the bore surface 75 to be manufactured from the same material as the outer joint part 50 by reducing the outer bore 74 diameter forming an inclination θ in the extended axial range E during the machining process. However, one in the trade would recognize that the bore surface 75 could be accomplished, among other ways, by tacking, staking, or riveting a material upon the outer bore 74 (see FIG. 7). Thus, when the connecting shaft 44 along with the inner joint part 52 and the rollers 58 are thrust, as a result of an unintended force, such as a crash, beyond the normal axial range N and into the extended axial range E of the joint 11, the spider sides 54 of the inner joint part 52 will interfere with or be impeded by the bore surfaces 75. The impediment of the bore surfaces 75 causes an increase in the thrust required for axial motion allowing energy to be absorbed by the constant velocity joint 11 and the propeller shaft 26. The bore surfaces 75 can be tuned to achieve different force levels, allowing for the design of a controlled energy absorption profile within the constant velocity joint 11. The tuning may be accomplished by changing the size, the shape, the material, or the location of the bore surfaces 75. Any number of bore surfaces 75 may be combined with any number of circlips 71, as in FIG. 3, in the extended axial range E of the constant velocity joint 11 to achieve a tuned and controlled energy absorption rate.

Thus, under normal operating conditions, the inner joint part 52 and the rollers 58 will operate in the normal axial range N of the constant velocity joint 11. In certain crash situations, however, the connecting shaft 44 along with the inner joint part 52 and the rollers 58 will be thrust toward the hollow shaft 42 allowing bore energy to be absorb along the extended axial range E caused by the impediment of the bore surface 75 of the outer joint part 50

Additionally as shown in FIG. 4, is an alternative embodiment of the joint having a tuned energy absorption surface 87, which is a bottom surface 88. The bottom surface 88 is circumferentially located in the extended axial range E, has an inclination θ1 and is coupled to the bottom 86 of the outer joint part 50 between any two oppositely disposed sidetracks 80 of the longitudinally extending tracks 60. In addition to or in the alternative, the bottom surface 88 can have multiple inclinations, stepped inclination, or variable inclination. There are three inclinations shown in FIG. 4 for the bottom surface 88 of this embodiment. The bottom surface 88 may be located between any of the one or more longitudinally extending tracks 60 in the extend axial range E. The bottom surface 88 may be manufactured by layering, i.e. welding, material upon the bottom 86 or by undercutting, while broaching, the bottom surface 88. One embodiment contemplates the bottom surface 88 to be manufactured from the same material as the outer joint part 50 by reducing the bottom surface 88 diameter forming an inclination θ1 in the extended axial range E during the machining process. However, one in the trade would recognize that the bottom surface 88 could be accomplished, among other ways, by tacking, staking, or riveting a material upon the bottom 86 (see FIG. 7). Thus, when the connecting shaft 44 along with the inner joint part 52 and the rollers 58 are thrust, as a result of an unintended force, such as a crash, beyond the normal axial range E of the joint 11, the tops 55 of the inner joint part 52 will interfere with or be impeded by the bottom surface 88. The impediment of the bottom surface 88 causes an increase in the thrust required for axial motion allowing energy to be absorbed by the constant velocity joint 11 and the propeller shaft 26. The bottom surface 88 can be tuned to achieve different force levels, allowing for the design of a controlled energy absorption profile within the constant velocity joint 11. The tuning may be accomplished by changing the size, the shape, the material, or the location of the bottom surface 88. Any number of bottom surfaces 88 may be combined with any number of circlips 71 or bore surfaces 75 in the extended axial range E of the constant velocity joint 11 to achieve a tuned and controllable energy absorption rate.

Thus, under normal operating conditions, the inner joint part 52 and the rollers 58 will operate in the normal axial range N of the constant velocity joint 11. In certain crash situations, however, the connecting shaft 44 along with the inner joint part 52 and the rollers 58 will be thrust toward the hollow shaft 42 allowing bottom energy to be absorb along the extended axial range E caused by the impediment of the bottom surface 88 of the outer joint part 50.

FIG. 5 shows a partial view of a constant velocity joint in accordance with an alternative embodiment of the present invention. In this embodiment, the joint has a tuned energy absorption surface 81, which is a track surface 82. The track surface 82 has a taper 84 and is located on a sidetrack 80 in the extended axial range E of the longitudinally extending track 60 of the outer joint part 50. There can be one or more track surfaces 82 located on anyone of the other sidetracks 80. The taper 82 may extend linearly over the extended axial range E as shown. Alternatively, not shown, the track surface may have a variable taper or a stepped taper of increasing or decreasing size. The track surface 82 may be manufactured by layering, i.e. welding, material upon the sidetrack 80 or by undercutting, while broaching, the track surface 82. One embodiment contemplates the track surface 82 is to be manufactured from the same material as the outer joint part 50 by reducing the track surface 82 taper in the extended axial range E during the machining process. However, one in the trade would recognize that the track surface 82 could be accomplished, among other ways, by tacking, staking, or riveting a material upon the bottom 86 (see FIG. 7). Thus, when the connecting shaft 44 along with the inner joint part 52 and the rollers 58 are thrust, as a result of an unintended force, such as a crash, beyond the normal axial range N and into the extended axial range E of the joint 11, the rollers 58 will interfere with or be impeded by the track surface 82. The impediment of the track surface 82 causes an increase in the thrust required for axial motion allowing energy to be absorbed by the constant velocity joint 11 and the propeller shaft 26. The track surface 82 can be tuned to achieve different force levels, allowing for the design of a controlled energy absorption profile within the constant velocity joint 11. The tuning may be accomplished by changing the size, the shape, the material, or the location of the track surface 82.

Thus, under normal operating conditions, the inner joint part 52 and the rollers 58 will operate in the normal axial range N of the constant velocity joint 11. In certain crash situations, however, the connecting shaft 44 along with the inner joint part 52 and the rollers 58 will be thrust toward the hollow shaft 42 allowing track energy to be absorb along the extended axial range E caused by the impediment of the rollers 58 of the inner joint part 52 upon the track surface 82 of the outer joint part 50.

Figure 6:
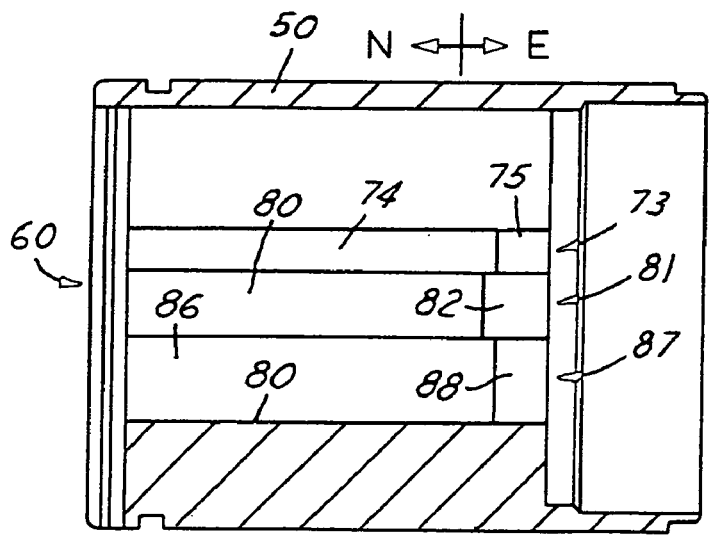
FIG. 6 shows a sectional view of an outer joint part of a constant velocity joint in accordance with the present invention.
Figure 7:
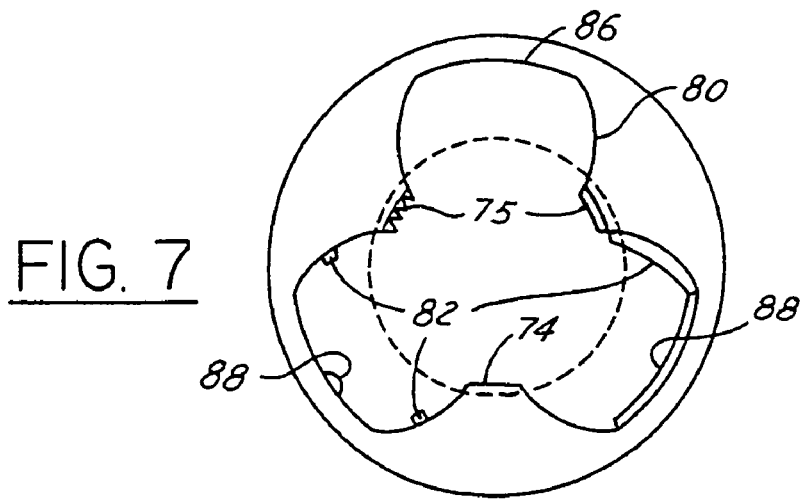
FIG. 7 shows an end view of an outer joint part of a constant velocity joint in accordance with the present invention.
Figure 8:
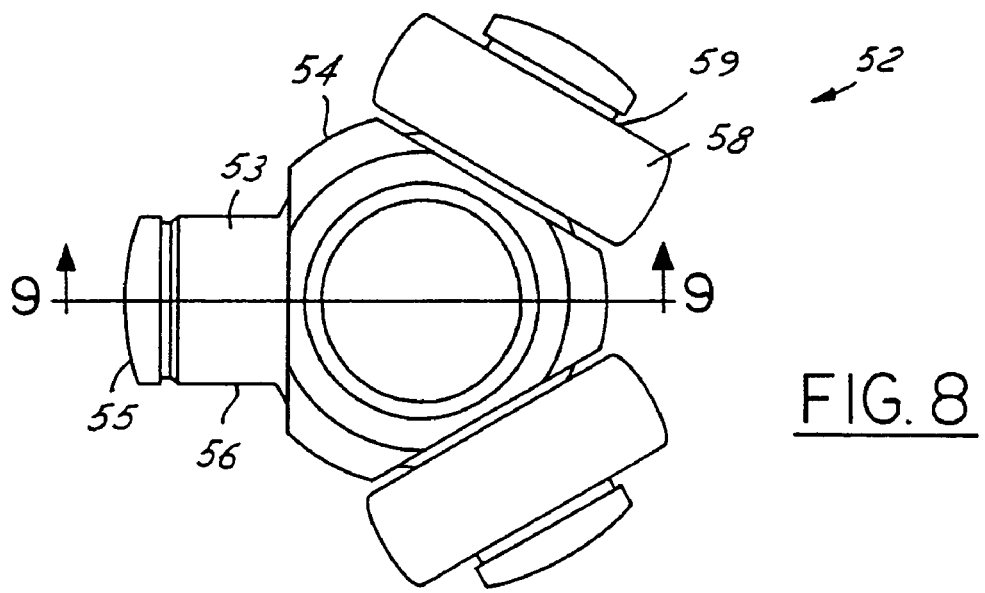
FIG. 8 shows a plan view of an inner joint part of a constant velocity joint in accordance with the present invention.
Figure 9:
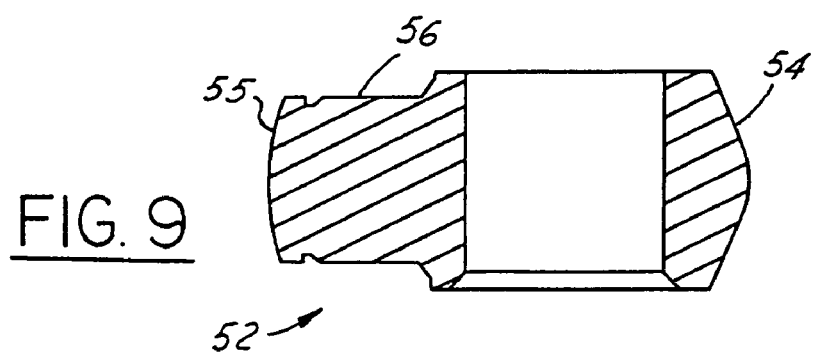
FIG. 9 shows a cross-sectional view of an inner joint part of FIG. 8.
Figure 10:
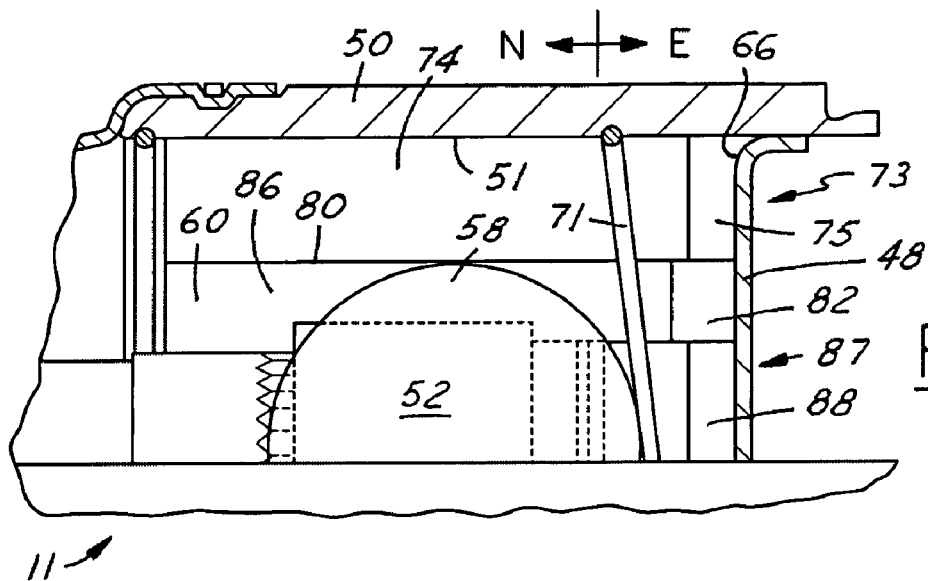
FIG. 10 shows a half-sectional view of a plunging constant velocity joint in an extended position in accordance with the embodiments of the present invention.
Figure 11:
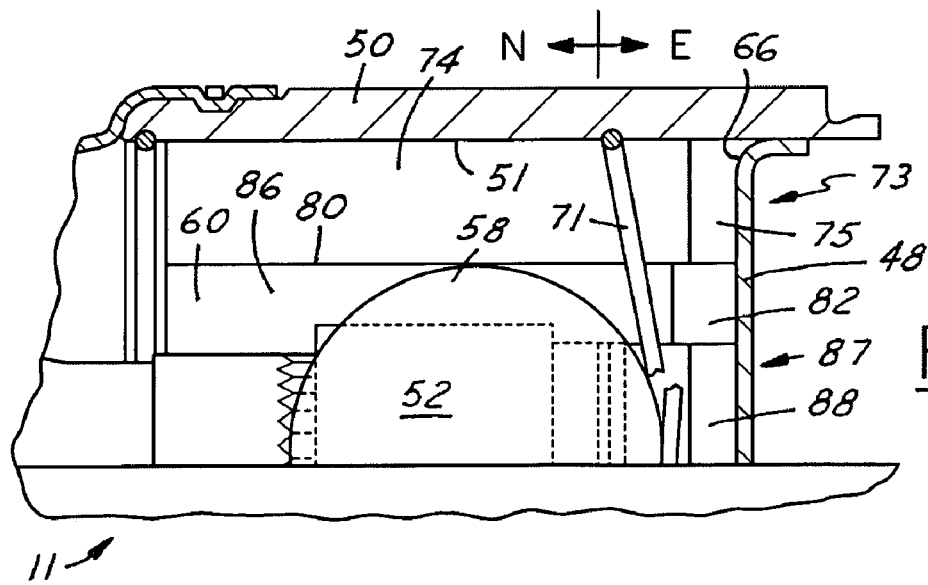
FIG. 11 shows a half-sectional view of a plunging constant velocity joint in an even further extended position as compared to FIG. 10 in accordance with the embodiments of the present invention.

FIG. 6 shows a sectional view of an outer joint part of a constant velocity joint in accordance with the present invention. The outer joint part 50 is shown having an outer bore 74 and a longitudinally extending track 60. The longitudinally extending track 60 having a bottom 86 spaced between two oppositely disposed longitudinal sidetracks 80. In the extended axial range, there are energy absorption surfaces 73, 81, 87, which are a bore surface 75, a track surface 82, and a bottom surface 88, respectfully. The bore surface 75 is located on the outer bore 74, the track surface 82 is located on the sidetrack 80, and the bottom surface 88 is located on the bottom 86, all of which are in the extended axial range of the outer joint part 50.

The one or more track surfaces 82, the one or more circlips 71, the one or more bottom surfaces 88, and the one or more bore surfaces 75 are combinable to achieve a controlled and tuned energy absorption rate when the constant velocity joint 11 is operated beyond it's normal axial range N.

From the foregoing, it can be seen that there has been brought to the art a new and improved crash-worthy constant velocity joint. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. An energy absorbing plunging constant velocity joint comprising:
    an outer joint part having innerly a normal axial range, an extended axial range, and a plurality of outer bores circumferentially spaced between a plurality of longitudinally extending tracks, each track having a bottom spaced between two oppositely disposed longitudinal sidetracks;
    an inner joint part disposed within said outer joint part having a plurality of spider sides circumferentially spaced between a plurality of trunions, each triunion having a top and an inner race;
    a plurality of rollers, wherein each roller has an inner bore mounted on a respective one of said inner race of said trunion, whereby angular and axial displacement occur between the inner joint part and the outer joint part; and
    one or more energy absorption surfaces distal to the normal axial range and located in the extended axial range upon said outer joint part, wherein the energy absorption surface on the outer joint part interferes with said inner joint part or at least one of the plurality of rollers when said outer joint part is operated beyond said normal axial range in the extended axial range,
    wherein one of the energy absorption surfaces is a circlip.

2. The joint according to claim 1, wherein the circlip is made from a deformable material.

3. The joint according to claim 2, wherein the deformable material is metal.

4. The joint according to claim 2, wherein the deformable material is plastic.

5. The joint according to claim 1, wherein the circlip is a ring.

6. An energy absorbing plunging constant velocity joint comprising:
    an outer joint part having innerly a normal axial range, an extended axial range, and a plurality of outer bores circumferentially spaced between a plurality of longitudinally extending tracks, each track having a bottom spaced between two oppositely disposed longitudinal sidetracks;
    an inner joint part disposed within said outer joint part having a plurality of spider sides circumferentially spaced between a plurality of trunions, each trunion having a top and an inner race;
    a plurality of rollers, wherein each roller has an inner bore mounted on a respective one of said inner race of said trunion, whereby angular and axial displacement occur between the inner joint part and the outer joint part; and
    one or more energy absorption surfaces distal to the normal axial range and located in the extended axial range upon said outer joint part, wherein the energy absorption surface on the outer joint part interferes with said inner joint part or at least one of the plurality of rollers when said outer joint part is operated beyond said normal axial range in the extended axial range,
    wherein one of the energy absorption surfaces is a bottom surface located on one of said bottoms and has one or more inclination, a stepped inclination or a variable inclination.

7. The joint according to claim 6, wherein the bottom surface is made from the same material piece as the outer joint part.

8. An energy absorbing plunging constant velocity joint comprising:
    an outer joint part having innerly a normal axial range, an extended axial range, and a plurality of outer bores circumferentially spaced between a plurality of longitudinally extending tracks, each track having a bottom spaced between two oppositely disposed longitudinal sidetracks;
    an inner joint part disposed within said outer joint part having a plurality of spider sides circumferentially spaced between a plurality of trunions, each trunion having a top and an inner race;
    a plurality of rollers, wherein each roller has an inner bore mounted on a respective one of said inner race of said trunion, whereby angular and axial displacement occur between the inner joint part and the outer joint part; and
    one or more energy absorption surfaces distal to the normal axial range and located in the extended axial range upon said outer joint part, wherein the energy absorption surface on the outer joint part interferes with said inner joint part or at least one of the plurality of rollers when said outer joint part is operated beyond said normal axial range in the extended axial range,
    wherein one of the energy absorption surfaces is a bore surface located on one of said outer bores and has one or more inclination, a stepped inclination or a variable inclination.

9. The joint according to claim 8, wherein the bore surface is made from the same material piece as the outer joint part.

10. An energy absorbing plunging constant velocity joint comprising:
    an outer joint part having innerly a normal axial range, an extended axial range, and a plurality of outer bores circumferentially spaced between a plurality of longitudinally extending tracks, each track having a bottom spaced between two oppositely disposed longitudinal sidetracks;
    an inner joint part disposed within said outer joint part having a plurality of spider sides circumferentially spaced between a plurality of trunions, each trunion having a top and an inner race;
    a plurality of rollers, wherein each roller has an inner bore mounted on a respective one of said inner race of said trunion, whereby angular and axial displacement occur between the inner joint part and the outer joint part; and
    one or more energy absorption surfaces distal to the normal axial range and located in the extended axial range upon said outer joint part, wherein the energy absorption surface on the outer joint part interferes with said inner joint part or at least one of the plurality of rollers when said outer joint part is operated beyond said normal axial range in the extended axial range, wherein one of the energy absorption surfaces is a track surface located on one of said side tracks and has one or more tapers or a stepped taper.

11. The joint according to claim 10, wherein the track surface is made from the same material piece as the outer joint part.

12. The joint according to claim 1, 6, 8 or 10, wherein the outer joint part further comprises a cylindrical open end located adjacent the extended axial range and distal to the normal axial range of the outer joint part and a grease cover sealingly attached to the cylindrical open end.

13. The joint according to claim 12, wherein the grease cover is displaceable when the joint has axial travel beyond the extended axial range.

14. The joint according to claim 1, 6, 8 or 10, wherein one or more of the energy absorption surfaces is machined, forged, or staked into the outer joint part in the extended axial range.

* * * * *